US012786790B2

(12) United States Patent
Wu et al.

(10) Patent No.: US 12,786,790 B2
(45) Date of Patent: Nov. 3, 2026

(54) CONCATENATED PHYSICAL LAYER CONVERGENCE PROTOCOL (PLCP) PROTOCOL DATA UNITS (PDUs)

(71) Applicant: Apple Inc., Cupertino, CA (US)

(72) Inventors: Tianyu Wu, Fremont, CA (US); Ahmad Reza Hedayat, Carlsbad, CA (US); Anuj Batra, Redwood City, CA (US); Jarkko L. Kneckt, Los Gatos, CA (US); Jinjing Jiang, San Jose, CA (US); Lochan Verma, Danville, CA (US); Oren Shani, Saratoga, CA (US); Qi Wang, Sunnyvale, CA (US); Su Khiong Yong, Palo Alto, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 190 days.

(21) Appl. No.: 18/586,380

(22) Filed: Feb. 23, 2024

(65) Prior Publication Data

US 2024/0292269 A1 Aug. 29, 2024

Related U.S. Application Data

(60) Provisional application No. 63/448,204, filed on Feb. 24, 2023.

(51) Int. Cl.
*H04W 28/06* (2009.01)

(52) U.S. Cl.
CPC ................................ *H04W 28/065* (2013.01)

(58) Field of Classification Search
CPC .......................... H04W 28/065; H04W 28/026
See application file for complete search history.

(56) References Cited

U.S. PATENT DOCUMENTS

| | | | | |
|---|---|---|---|---|
| 8,665,906 | B1 * | 3/2014 | Liu | H04W 28/18 370/473 |
| 2021/0399864 | A1 * | 12/2021 | Lim | H04L 1/0025 |
| 2021/0409165 | A1 * | 12/2021 | Wang | H04L 1/1896 |
| 2022/0385437 | A1 * | 12/2022 | Shellhammer | H04L 5/0092 |
| 2022/0416971 | A1 * | 12/2022 | Noh | H04L 5/0048 |
| 2024/0023019 | A1 * | 1/2024 | Hu | H04W 72/12 |
| 2024/0163008 | A1 * | 5/2024 | Huang | H04L 1/0027 |
| 2024/0163871 | A1 * | 5/2024 | Malichenko | H04W 72/542 |
| 2024/0215048 | A1 * | 6/2024 | Minotani | H04L 27/2602 |
| 2025/0184973 | A1 * | 6/2025 | Cariou | H04L 5/0064 |
| 2025/0365609 | A1 * | 11/2025 | Li | H04W 28/0268 |

* cited by examiner

*Primary Examiner* — Andrew Lee
(74) *Attorney, Agent, or Firm* — Fish & Richardson P.C.

(57) ABSTRACT

Disclosed are methods, systems, and computer-readable medium to perform operations including obtaining data for transmission to a receiver; and generating a first component physical layer convergence protocol (PLCP) protocol data unit (PPDU) of a plurality of component PPDUs of a concatenated (C-PPDU), where the first component PPDU is directed to the receiver and includes at least a portion of the data.

20 Claims, 21 Drawing Sheets

700

| Subfield | #Bits | Description |
|---|---|---|
| Length | 12 | Length of the component PPDU |
| LDPC Extra Symbol Segment | 1 | LDPC Extra Symbol Segment for the component PPDU |
| Pre-FEC Padding Factor | 1 | Pre-FEC Padding Factor for the component PPDU |
| PE Disambiguity | 1 | PE Disambiguity for the component PPDU |
| Same target STA | 1 | Set to 1 indicates the component PPDU is sent to the same (set) of target STA(s) as last component PPDU. Set to 0 indicates the component PPDU is send to a different (set) of target STA(s). |
| CRC | 4 | |
| Tail | 6 | |

FIG. 7

800

| Subfield | #Bits | Description |
|---|---|---|
| Length | 8 | Number of OFDM symbols in the data field |
| LDPC Extra Symbol Segment | 1 | LDPC Extra Symbol Segment for the component PPDU |
| Pre-FEC Padding Factor | 1 | Pre-FEC Padding Factor for the component PPDU |
| Reserved | 5 | |
| Same target STA | 1 | Set to 1 indicates the component PPDU is send to the same (set) of target STA(s) as last component PPDU. Set to 0 indicates the component PPDU is send to a different (set) of target STA(s). |
| CRC | 4 | |
| Tail | 6 | |

FIG. 8

1220

| SUBFIELD | #BITS | DESCRIPTION |
|---|---|---|
| LENGTH | 8 | NUMBER OF OFDM SYMBOLS IN THE DATA FIELD |
| LDPC EXTRA SYMBOL SEGMENT | 1 | LDPC EXTRA SYMBOL SEGMENT FOR THE COMPONENT PPDU |
| PRE-FEC PADDING FACTOR | 1 | PRE-FEC PADDING FACTOR FOR THE COMPONENT PPDU |
| **PRESENCE OF UHR-FIELDS** | **1** | **SET TO 1 INDICATES UHR-SIG, UHR-STF AND UHR-LTF(s) ARE PRESENT IN THE FOLLOWING COMPONENT PPDU OF THE C-PPDU** |
| RESERVED | 4 | |
| SAME TARGET STA | 1 | SET TO 1 INDICATES THE COMPONENT PPDU IS SENT TO THE SAME (SET) OF TARGET STA(s) AS LAST COMPONENT PPDU. SET TO 0 INDICATES THE COMPONENT PPDU IS SENT TO A DIFFERENT (SET) OF TARGET STA(s). |
| CRC | 4 | |
| TAIL | 6 | |

FIG. 12B

CONCATENATED PHYSICAL LAYER CONVERGENCE PROTOCOL (PLCP) PROTOCOL DATA UNITS (PDUs)

CROSS-REFERENCE TO RELATED APPLICATIONS

This application claims priority to U.S. Provisional Application No. 63/448,204, filed on Feb. 24, 2023, which is incorporated herein by reference in its entirety.

BACKGROUND

Many electronic devices communicate with each other using wireless local area networks (WLANs), such as those based on a communication protocol that is compatible with an Institute of Electrical and Electronics Engineers (IEEE) standard, e.g., the IEEE 802.11 standard (also known as "Wi-Fi"). A WLAN typically includes an access point that provides one or more stations (STAs) with access to another network, such as the Internet. There are many generations of the IEEE 802.11 standard. More recent generations include 802.11ax (Wi-Fi 6) and 802.11be (Wi-Fi 7).

IEEE 802.11 is a packet-based protocol. Under this protocol, a transmitter, e.g., an access point, packages control information or user data into a protocol data unit (PDU) in a physical layer convergence protocol (PLCP). The PLCP PDU (PPDU) includes a preamble and a data field, among other fields. After generating the PPDU, the access point can send the PPDU to a station connected to the access point. Communication from the access point to a station is referred to as the downlink, and the communication from a station to the access point is referred to as the uplink.

SUMMARY

This disclosure describes methods and systems for improving spectrum efficiency when using short PPDUs for low latency (e.g., 1 ms). One aspect of the subject matter described in this specification may be embodied in a method that involves obtaining data for transmission to a receiver; and generating a first component physical layer convergence protocol (PLCP) protocol data unit (PPDU) of a plurality of component PPDUs of a concatenated (C-PPDU), where the first component PPDU is directed to the receiver and includes at least a portion of the data.

The previously described implementation is implementable using a method; a non-transitory, computer-readable medium storing computer-readable instructions to perform the method; one or more processors configured to perform the method; a transmitter including processing circuitry configured to cause the transmitter to perform the method; a computer memory interoperably coupled with a hardware processor configured to perform the method or the instructions stored on the non-transitory, computer-readable medium. These and other embodiments may each optionally include one or more of the following features.

In some implementations, the plurality of component PPDUs are scheduled to be transmitted consecutively in time.

In some implementations, generating the first component PPDU involves including the portion of the data in a data field of the first component PPDU, and the method further involves transmitting the first component PPDU to the receiver.

In some implementations, the method further involves receiving, from the receiver, a block acknowledgement (BA) for the first component PPDU after the plurality of component PPDUs are transmitted.

In some implementations, generating the first component PPDU involves determining that a length of the first component PPDU is less than or equal to a desired communication latency between a transmitter and the receiver.

In some implementations, the desired communication latency is 1 millisecond (ms).

In some implementations, generating the first component PPDU involves determining to operate in a low latency mode; and responsively generating the first component PPDU.

In some implementations, generating the first component PPDU involves generating a full preamble for the first component PPDU, the full preamble including at least one of: (i) a length field that includes a length of the C-PPDU, (ii) a universal signal field (U-SIG) that includes a format of the C-PPDU, or (iii) a local signal field that includes a length of the first component PPDU.

In some implementations, the method further involves: generating a second component PPDU of the plurality, the second component PPDU is directed to the receiver; and including in the second component PPDU an abbreviated preamble including at least one of: (i) a target field that indicates whether the second component PPDU is directed to the same receiver as the first component PPDU; or (ii) a second length field that includes a length of the second component PPDU.

In some implementations, the method further involves generating a second component PPDU of the plurality, the second component PPDU is directed to the receiver; and including in the second component PPDU an abbreviated preamble including at least one of: (i) a target field that indicates whether the second component PPDU is directed to the same receiver as the first component PPDU; or (ii) a second length field that includes a number of symbols in a data field of the second component PPDU.

In some implementations, lengths of respective data fields of the plurality of component PPDUs are identical, and the method further involves generating a second component PPDU of the plurality without a preamble, where the second component PPDU is directed to the receiver.

In some implementations, the receiver is a first receiver, and the method further involves: generating a second component PPDU of the plurality, where the second component PPDU is directed to a second receiver; and including in the second component PPDU an abbreviated preamble including: a mid signal (MID-SIG) preamble signaling length and coding related physical layer parameters of the second component PPDU; and a plurality of fields signaling physical layer parameters of the second component PPDU, where a presence of the plurality of fields in the abbreviated preamble is signaled in the MID-SIG preamble.

In some implementations, generating the first component PPDU further involves multiplexing the first component PPDU in frequency with at least one other PPDU in a multiuser PPDU (MU-PPDU).

In some implementations, the at least one other PPDU is another component PPDU.

In some implementations, the MU-PPDU is directed to: (i) one or more users of a first target user set, or (ii) one or more users of different target user sets.

In some implementations, generating the first component PPDU further involves aggregating the first component PPDU in frequency with at least one other PPDU in an aggregated PPDU (A-PPDU), where the at least one other PPDU is a regular PPDU.

In some implementations, the receiver is a first receiver, and at least one of the plurality of component PPDUs is directed to a second receiver different than the first receiver.

In some implementations, the method further involves: transmitting the first component PPDU to the receiver; during transmission of the first component PPDU, obtaining urgent data for transmission to the receiver; in response, generating a second component PPDU that includes an abbreviated preamble; including in the abbreviated preamble an indication that the second component PPDU is a last component PPDU of the C-PPDU; and terminating the C-PPDU after transmitting the second component PPDU.

In some implementations, the method further involves receiving, from the receiver, a block acknowledgment after transmitting the second component PPDU.

In some implementations, the method further involves receiving, from the receiver, a block acknowledgment after transmitting the second component PPDU.

In some implementations, the receiver is a first receiver, and the method further involving: generating a second component PPDU of the plurality, where the second component PPDU is directed to a second receiver; and including in the second component PPDU a mid signal (MID-SIG) preamble and a legacy long training field (L-LTF).

In some implementations, a transmitter uses beamforming to communicate with the first receiver and the second receiver.

Another aspect of the subject matter described in this specification may be embodied in a method that involves receiving, from an electronic device, a first component physical layer convergence protocol (PLCP) protocol data unit (PPDU) of a plurality of component PPDUs of a concatenated (C-PPDU); and processing the first component PPDU to obtain data sent by the electronic device.

The previously described implementation is implementable using a method; a non-transitory, computer-readable medium storing computer-readable instructions to perform the method; one or more processors configured to perform the method; a receiver including one or more processors configured to cause the receiver to perform the method; a computer memory interoperably coupled with a hardware processor configured to perform the method or the instructions stored on the non-transitory, computer-readable medium. These and other embodiments may each optionally include one or more of the following features.

The details of one or more embodiments of these systems and methods are set forth in the accompanying drawings and description below. Other features, objects, and advantages of these systems and methods will be apparent from the description, drawings, and claims.

BRIEF DESCRIPTION OF THE FIGURES

FIG. 7 illustrates a table of the subfields of a MID-SIG, according to some implementations.

FIG. 8 illustrates a table of the subfields of another MID-SIG, according to some implementations.

FIG. 12B illustrates a table of the subfields of another example MID-SIG, according to some implementations.

DETAILED DESCRIPTION

One of the goals of next generation Wi-Fi (e.g., 802.11bx or Wi-Fi 8) is to support ultrahigh reliability (UHR) traffic. Another goal is to support low latency traffic, which may be, for example, traffic with a latency of 1 millisecond (ms). Low latency traffic may be used in scenarios of a light contention channel with few active receiver stations. Existing physical layer convergence protocol (PLCP) protocol data units (PPDUs), however, typically have lengths longer than 1 ms. Currently, PPDU lengths may be up to 6 ms, and are commonly between 2-4 ms. These existing PPDUs cannot support low latency traffic that is shorter than those PPDU lengths. One proposal for achieving low latency traffic is to use PPDUs that are shorter than the desired latency. For example, PPDUs shorter than 1 ms are used to achieve a 1 ms latency. In this disclosure, a short PPDU is a PPDU that has a length less than or equal to a desired latency. Although a 1 ms latency is used in this disclosure as an illustrative example, other latency values and corresponding short PPDU lengths are possible and are contemplated herein. Additionally, although an access point is described herein as a transmitter and one or more stations as receivers, those roles can be reversed.

Figure 1A:
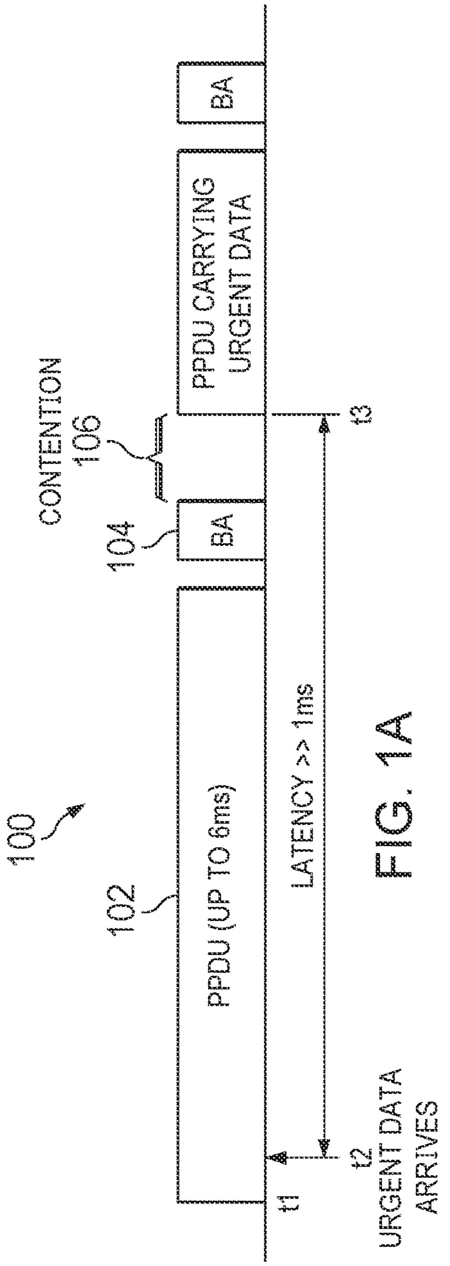
FIG. 1A illustrates an example showing that existing PPDUs cannot support low latency traffic.

FIG. 1A illustrates an example 100 showing that existing PPDUs cannot support low latency traffic. In this example, at time t1 an access point starts transmitting to a receiver station a PPDU 102 that has a 6 ms length. At time t2, the access point obtains urgent data for transmission to the receiver station. However, because the access point has already started transmitting the PPDU 102, the transmitter cannot stop the transmission to transmit the urgent data. Rather, as shown in FIG. 1A, the transmitter completes the transmission, awaits a block acknowledgement (BA) 104 from the receiver station, performs contention 106 on the channel to access the channel again, and then finally at time t3 transmits the urgent data. The time between t2 and t3 is much greater than the desired low latency times (e.g., 1 ms). As shown by this example, low latency cannot be consistently achieved using existing PPDUs.

Figure 1B:
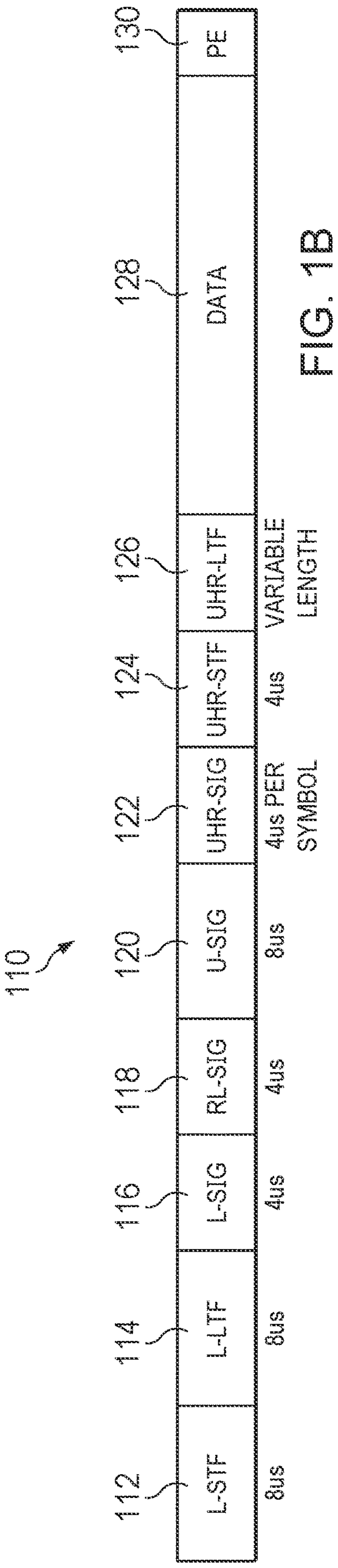
FIG. 1B illustrates the subfields of a PPDU for UHR traffic, according to some implementations.

FIG. 1B illustrates the subfields of a PPDU 110 for UHR traffic, according to some implementations. As shown in FIG. 1B, the PPDU 110 includes a legacy short training field (L-STF) 112, a legacy long training field (L-LTF) 114, a legacy signal field (L-SIG) 116, a repeat legacy signal field (RL-SIG) 118, a universal signal field (U-SIG) 120, a UHR signal field (UHR-SIG) 122, a UHR short training field (UHR-STF) 124, one or more UHR long training fields (UHR-LTF(s)) 126, a data field 128, and a packet extension (PE) field 130.

Although using short PPDUs achieves lower latency, the spectrum efficiency decreases as the PPDU length decreases. For instance, reducing the PPDU length increases the overhead due to the larger percentage of the bandwidth that is allocated to the preamble (e.g., more BAs and contentions). As an example, a 1 ms PPDU has approximately 16% overhead, whereas a 4 ms PPDU has approximately 4% overhead.

Figure 2:
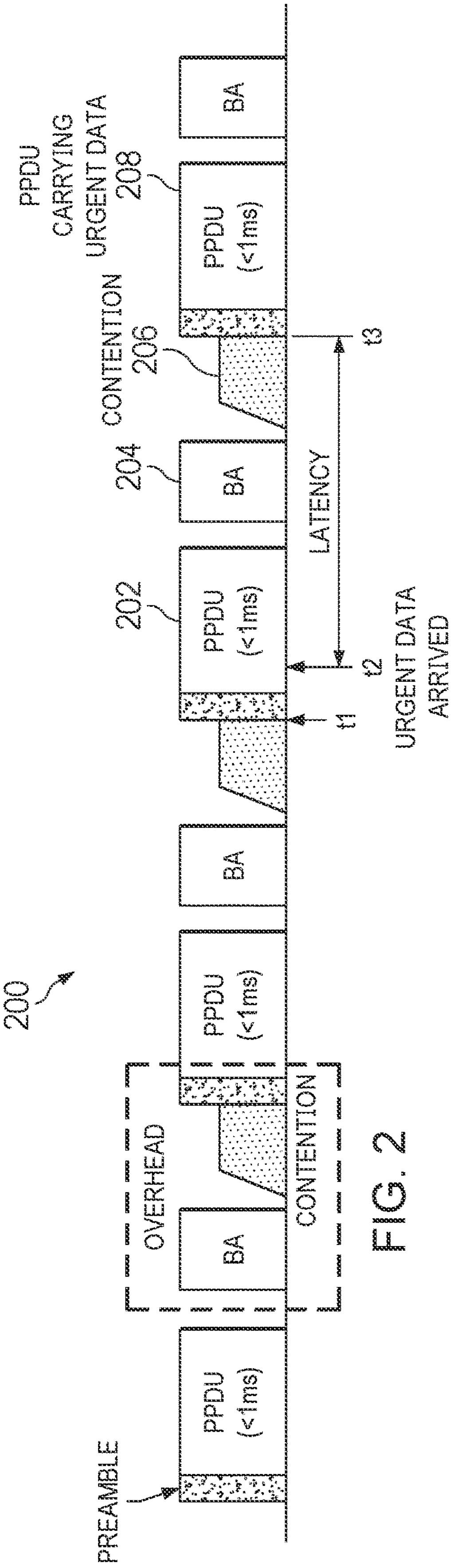
FIG. 2 illustrates an example of a shortened PPDU, resulting in a decrease in spectrum efficiency.

FIG. 2 illustrates an example 200 of a shortened PPDU 202, resulting in a decrease in spectrum efficiency. As shown in FIG. 2, at time t1 an access point transmits a short PPDU 202 (e.g., that has a length less than 1 ms). At time t2, the access point receives urgent data for transmission. The access point completes transmission of the short PPDU 202, receives a BA 204, and performs contention 206. Then, at time t3, the transmitter transmits a short PPDU 208 that carries the urgent data. Because the length of the PPDU 202 is less than 1 ms, the difference in time between t2 and t3 is less than 1 ms. As a result, the target latency is achieved. However, as shown in FIG. 2, each PPDU transmission results in its own overhead that includes a preamble, a BA, and a contention period. This increase in overhead compared to the legacy PPDU transmission results in a decrease of spectrum efficiency. In this disclosure, the period between two consecutive PPDUs (e.g., the period of time that includes BA, contention, etc., after each PPDU) is referred to as an inter-data frame overhead.

This disclosure describes methods and systems for improving spectrum efficiency when using short PPDUs for low latency (e.g., 1 ms). In some examples, if a transmitter (e.g., an access point) is operating in low latency, the transmitter is configured to define a concatenated PPDU (C-PPDU) that includes a plurality of component PPDUs, where each component PPDU is a short PPDU. The C-PPDU has short preamble lengths and a reduced number of interframe space (IFS), BAs, and contentions. As will be described in more detail below, the spectrum efficiency of the C-PPDU is similar to existing longer PPDUs. As an example, a 6 ms C-PPDU with 1 ms component PPDUs has an overhead percentage of approximately 5%. This overhead percentage is similar to the overhead percentage of a 6 ms long PPDU, and therefore, the 6 ms C-PPDU has a similar spectrum efficiency to the 6 ms long PPDU.

Figure 3:
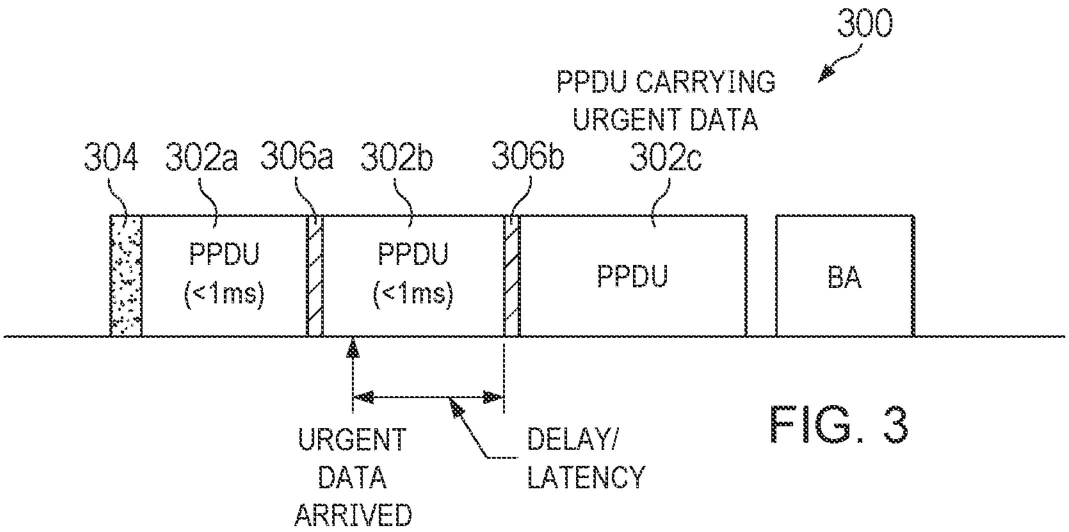
FIG. 3 illustrates an example C-PPDU, according to some implementations.

FIG. 3 illustrates an example C-PPDU 300, according to some implementations. In this example, the C-PPDU 300 includes a plurality of short component PPDUs 302*a*, 302*b*, 302*c*. As shown in FIG. 3, the C-PPDU 300 includes a preamble 304 before the first short component PPDU 302*a*, a short preamble 306*a* before the second short component PPDU 302*b*, and a short preamble 306*b* before the third short component PPDU 302*c*. Notice that the C-PPDU 300 does not include BA and/or contention between the short plurality of short PPDUs. Instead, BA and/or contention is performed after the plurality of short component PPDUs. Compared to the example 200 of FIG. 2, the C-PPDU 300 includes shorter preamble lengths, and there is a reduced number of IFS, BA, and contentions, which improves spectrum efficiency.

In some implementations, the access point can generate part of the first component PPDU and start transmitting it while keep generating the rest of the part. The access point can do the same for the remaining component PPDUs.

Figure 4:
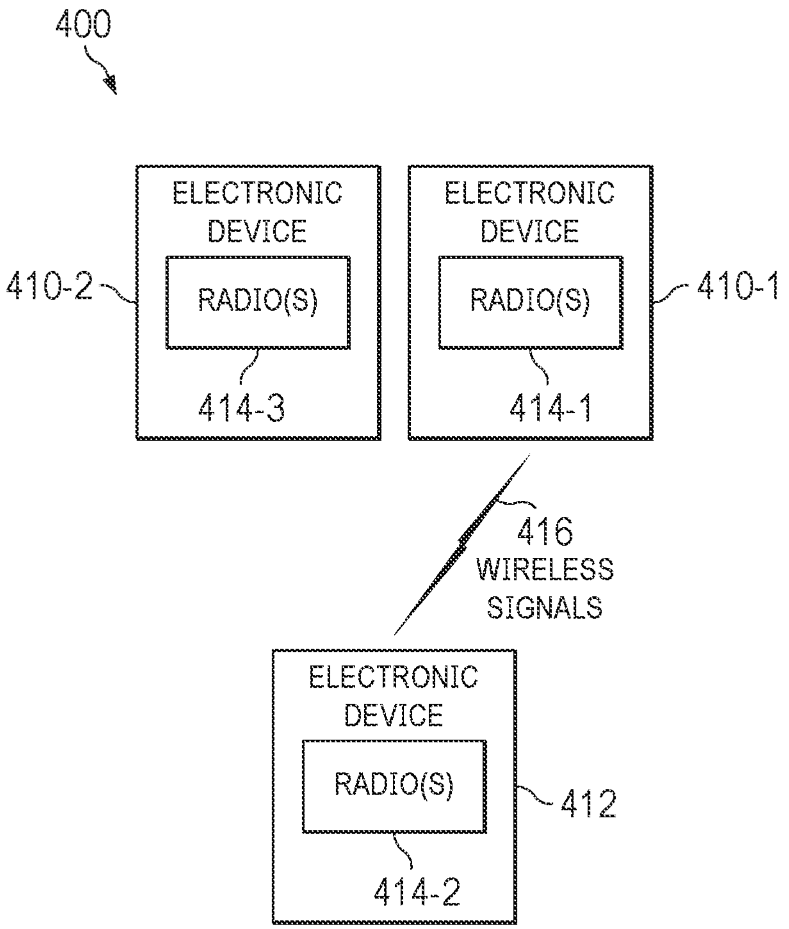
FIG. 4 illustrates a block diagram of example of electronic devices communicating wirelessly, according to some implementations.

FIG. 4 illustrates a block diagram 400 of example of electronic devices communicating wirelessly, according to some implementations. Notably, one or more electronic devices 410 (such as a smartphone, a laptop computer, a notebook computer, a tablet, or another such electronic device) and access point 412 may communicate wirelessly in a WLAN using an IEEE 802.11 communication protocol. Thus, electronic devices 410 may be associated with or may have a connection with access point 412. For example, electronic devices 410 and access point 412 may wirelessly communicate while: detecting one another by scanning wireless channels, transmitting and receiving beacons or beacon frames on wireless channels, establishing connections (e.g., by transmitting connect requests), and/or transmitting and receiving packets or frames (which may include the request and/or additional information, such as data, as payloads). Note that the access point 412 may provide access to a network, such as the Internet, via an Ethernet protocol, and may be a physical access point or a virtual or "software" access point that is implemented on a computer or an electronic device. In the discussion that follows, electronic devices 410 are sometimes referred to as "recipient electronic devices" or "receiver stations."

Although the network environment shown in FIG. 4 is provided as an example, in alternative implementations, different numbers and/or types of electronic devices may be present. For example, some implementations may include more or fewer electronic devices. As another example, in other implementations, different electronic devices can be transmitting and/or receiving packets or frames. In some implementations, multiple links may be used during communication between electronic devices 410.

As described further below with reference to FIG. 16, electronic devices 410 and access point 412 may include subsystems, such as a networking subsystem, a memory subsystem, and a processor subsystem. In addition, electronic devices 410 and access point 412 may include radios 414 in the networking subsystems. More generally, electronic devices 410 and access point 412 can include (or can be included within) any electronic devices with networking subsystems that enable electronic devices 410 and access point 412, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options, transmit and receive packets or frames via the connection, etc.

As shown in FIG. 4, wireless signals 416 are communicated by one or more radios 414-1 and 414-2 in electronic device 410-1 and access point 412, respectively. For example, as noted previously, electronic device 410-1 and access point 412 may exchange packets or frames using a Wi-Fi communication protocol in a WLAN. Further, one or more radios 414-1 may receive wireless signals 416 that are transmitted by one or more radios 414-2 via one or more links between electronic device 410-1 and access point 412. Alternatively, the one or more radios 414-1 may transmit wireless signals 416 that are received by the one or more radios 414-2.

In some implementations, wireless signals 416 are communicated by one or more radios 414 in electronic devices 410 and access point 412, respectively. For example, one or more radios 414-1 and 414-3 may receive wireless signals 416 that are transmitted by one or more radios 414-2 via one or more links between electronic devices 410-1 and 410-2, and access point 412.

In some implementations, the access point 412 may group the electronic devices 410 into a target station set. The target station set concept comes from downlink multi-user transmission where the access point 412 can transmit to multiple stations simultaneously in one PPDU using OFDMA or MU-MIMO. Here, target station set is a set of stations that can simultaneously be served by the access point 412. The stations in the set do not need to share the same PHY parameters, such as MCS, number of streams, etc.

In some implementations, the access point 412 can simultaneously communicate with a plurality of electronic devices 410 using multiuser (MU) techniques, such as MU Multiple Input Multiple Output (MU-MIMO). In some examples, the access point 412 communicates with the electronic devices 410 using frequency multiplexing such that the access point 412 allocates each of the electronic devices a portion of the overall bandwidth. For example, to simultaneously communicate with four electronic devices over an 80 Megahertz (MHz) bandwidth, the access point 412 transmits a MU-PPDU over the 80 MHz bandwidth. The MU-PPDU includes a sub-PPDU for each of the four electronic devices, where each sub-PPDU (or sub-channel) is allocated 20 MHz. The access point 412 may use the MU-PPDU to communicate with devices in the same target set, devices in different target sets, or a combination of both.

Figure 5:
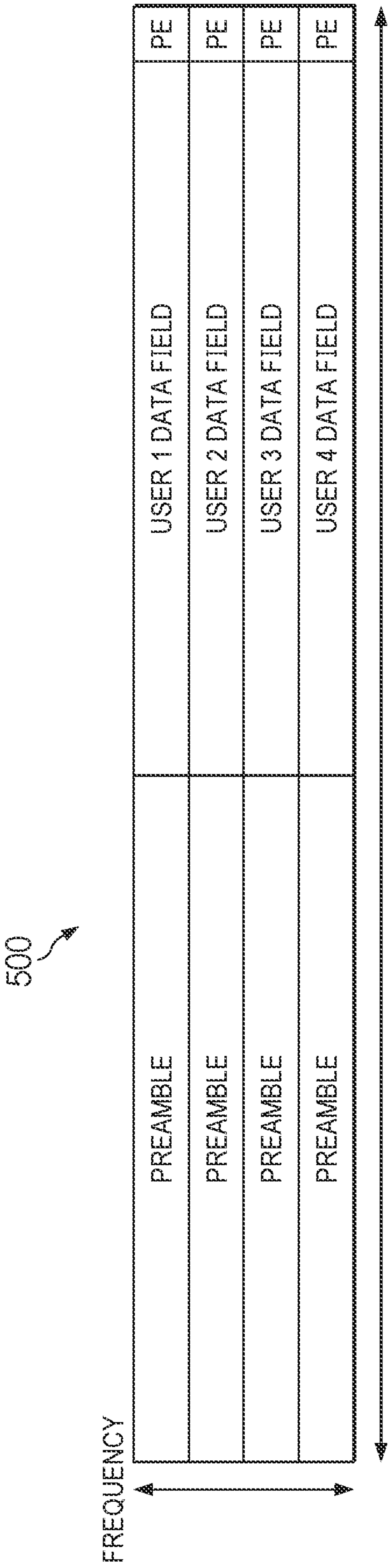
FIG. 5 illustrates an example MU-PPDU, according to some implementations.

FIG. 5 illustrates an example MU-PPDU 500, according to some implementations. In this example, the access point 412 is communicating with four electronic devices (users). To communicate with the four electronic devices simultaneously, the access point transmits the MU-PPDU that includes four PPDUs multiplexed in frequency. Each PPDU includes a data field that includes data directed to the corresponding user.

In some implementations, access point 412 and one or more electronic devices may be compatible with an IEEE 802.11 standard that includes trigger-based channel access, e.g., IEEE 802.11ax. In 802.11ax, which is a more recent WLAN standard, Orthogonal Frequency Division Multiple Access (OFDMA) is used to enable simultaneous communications between the access point 412 and multiple electronic devices. OFDMA divides the available physical spectrum into multiple orthogonal sub-channels, or resource units (RUs), which can be allocated to different electronic devices (users). Under the standard, the access point 412 coordinates multiuser OFDMA by broadcasting a trigger frame which, among other things, allocates a RU to each participating electronic device. Each electronic device responds to the trigger frame by transmitting a PPDU to the access point 412 using the allocated RU. The trigger frame can also include power control information. The access point 412 also instructs all users when to start and stop transmitting. Note that access point 412 and the electronic devices may also communicate with one or more legacy electronic devices that are not compatible with the IEEE 802.11 standard (i.e., that do not use multi-user trigger-based channel access).

In some implementations, processing a packet or frame in one of electronic devices 410 and access point 412 includes: receiving wireless signals 416 encoding a packet or a frame; decoding/extracting the packet or frame from received wireless signals 416 to acquire the packet or frame; and processing the packet or frame to determine information contained in the packet or frame (such as data in the payload).

As discussed previously, one or more of electronic devices 410 and access point 412 may communicate with each other. Notably, access point 412 may transmit a PPDU that includes a preamble and a data field. However, in existing IEEE 802.11 communication protocols, existing PPDUs typically have lengths longer than what can support low latency communications. These existing PPDUs cannot support low latency traffic that is shorter than the PPDU length.

To address this challenge, an access point (e.g., 412) may be configured to use concatenated PPDUs (C-PPDUs). A C-PPDU includes a plurality of component PPDUs, each of which includes preamble and a data payload. As described in more detail below, the C-PPDU includes a plurality of component PPDUs. The first component PPDU is preceded by a first preamble called a "full preamble." The remaining component PPDUs in the C-PPDU are each preceded by respective preambles that are shorter in length than the first preamble and are therefore referred to herein as "short preambles." Furthermore, the access point 412 does not perform contention or receive a BA before the plurality of component PPDUs are transmitted (unless the C-PPDU is terminated, as described below). Note that when there is urgent data, the BA is typically for the last component PPDU which carries the urgent data. When there is no urgent data, whether there is an immediate BA or not depends on the ACK policy set by the users.

Figure 6:
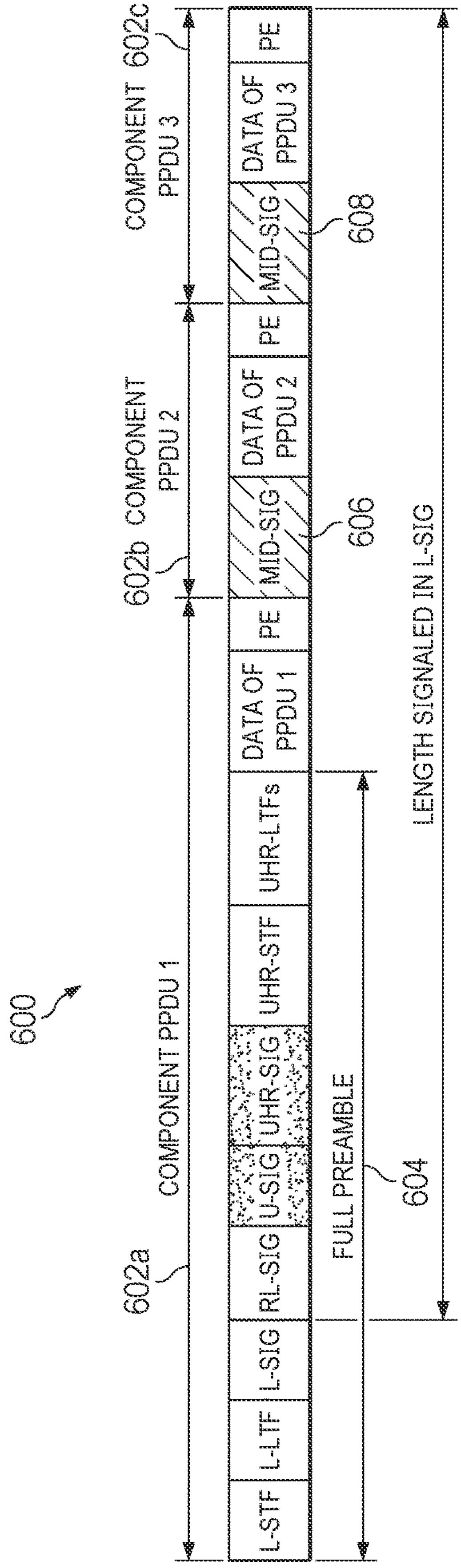
FIG. 6 illustrates an example concatenated PPDU, according to some implementations.

FIG. 6 illustrates an example concatenated PPDU 600, according to some implementations. In this example, the concatenated PPDU 600 includes a plurality of component PPDUs 602*a*, 602*b*, 602*c* (also labelled component PPDU 1, component PPDU 2, and component PPDU 3 respectively). As shown in FIG. 6, the first component PPDU 602*a* (e.g., the component PPDU that is scheduled first in time) includes a full preamble 604, and the remaining component PPDUs include short preambles 606, 608. The short preambles 606, 608 are shorter than the full preamble 604.

In some examples, the full preamble 604 includes one or more of: (i) an L-STF field, (ii) an L-LTF field, (iii) an L-SIG field, (iv) an RL-SIG field, (v) a U-SIG field, (vi) a UHR-SIG field, (vii) a UHR-STF field, or (viii) a UHR-LTF field. In some examples, the L-SIG field includes an indication of the length of the entire C-PPDU. Signaling length of the entire C-PPDU in L-SIG ensures compatibility with legacy systems, which use L-SIG to signal the length of a PPDU (e.g., PPDU 102 of FIG. 1A). The U-SIG field includes an indication of a UHR-SIG format and/or a C-PPDU format. The UHR-SIG field includes an indication, in a common field, of the length of the first component PPDU 602*a*.

Turning to the short preambles 606, 608, these preambles can be shortened since many physical layer (PHY) parameters, such as Modulation Coding Scheme (MCS)/Number of Spatial Streams (NSS), RU allocation, etc., can be reused from the first component PPDU 602*a*. Thus, for the same set of target stations, L-STF, L-LTF, L-SIG, RL-SIG, UHR-SIG, UHR-STF and UHR-LTF can be removed from the preambles of the component PPDUs after the first component PPDU. This leaves U-SIG. In some examples, U-SIG is replaced by a MID-SIG preamble (e.g., MID-SIG 606) that carries length/coding related PHY parameters. Such parameters include a length of the corresponding component PPDU, a low-density parity-check (LDPC) extra symbol for the corresponding component PPDU, a pre-forward error correction (pre-FEC) Padding Factor, packet extension disambiguity information, among other information. The packet extension disambiguity information is a parameter related to the packet extension (PE) field added to the corresponding component PPDU. It is used by the receiver station to calculate the number of OFDM symbols in the component PPDU. In some examples, the field carrying the length of the corresponding component PPDU within the MID-SIG is allocated 12 bits. Doing so makes the length field in the MID-SIG compatible with the preamble field "L-SIG."

FIG. 7 illustrates a table 700 of the subfields of a MID-SIG, according to some implementations. As shown in table 700, the example MID-SIG includes the subfields: (i) length, (ii) LDPC extra symbol segment, (iii) pre-FEC Padding Factor, (iv) PE disambiguity, (v) same target STA, (vii) cyclic redundancy check (CRC), and (viii) Tail. The length field is allocated 12 bits and includes a length of the corresponding component PPDU. The length field can be used by the receiver to calculate the number of OFDM symbols in the corresponding component PPDU. The LDPC extra symbol segment field is allocated 1 bit and includes LDPC extra symbol segment for the corresponding component PPDU. The pre-FEC Padding Factor is allocated 1 bit and includes a pre-FEC Padding Factor for the corresponding component PPDU. The PE disambiguity is allocated 1 bit and includes a is allocated 1 bit and includes a PE disambiguity for the corresponding component PPDU. The same target station field is allocated 1 bit. The field is set to 1 to indicate that the corresponding component PPDU is sent to the same (set) of target station(s) as the last component PPDU. The field is set to 0 to indicate that the component PPDU is sent to a different set of target station(s). Implementations that involve sending different component PPDUs to different sets of targets stations are described in more detail below.

In some implementations, backward compatibility is not needed for signaling the length of each component PPDU. In these implementations, a range of the length field can be defined for the component PPDU. In particular, the length of data field for each component PPDU is signaled by the number of OFDM symbols in the length field of the MID-SIG. To illustrate, consider a scenario where the data field of each component PPDU is less than or equal to 256 OFDM symbols (i.e., the data field is less than or equal to 3.48 ms). In this scenario, an 8 bit length field is defined to signal the number of OFDM symbols in the data field. Furthermore, in these implementations, because the length of the data field is signaled, PE disambiguity is no longer needed and is removed from the MID-SIG.

FIG. 8 illustrates a table 800 of the subfields of another MID-SIG, according to some implementations. The MID-SIG described by table 800 is not backwards compatible with legacy preambles. The table 800 is similar to the table 700, but with three differences. The first difference is that the bitlength of the length field is based on the maximum number of OFDM symbols of the data field. In this example, the data field of each component PPDU is less than or equal to 256 OFDM symbols, and therefore, the bitlength of the length field is 8 bits. The second difference is that the MID-SIG does not include a PE disambiguity field. The third difference is that there are 5 bits that are reserved. These 5 bits result from a shorter length field and removal of the PE disambiguity field.

In implementations, the length of data field in all component PPDUs is configured to be identical. In these implementations, the length of data field for each component PPDU is signaled in the UHR-SIG field of the full preamble. Because the length of the data field is fixed, all the component PPDUs share the same physical layer parameters, including LDPC Extra Symbol, Pre-FEC Padding Factor, and PE disambiguity. Thus, the MID-SIG before each component PPDU is not needed. An example of such a C-PPDU is illustrated in FIG. 9.

Figure 9:
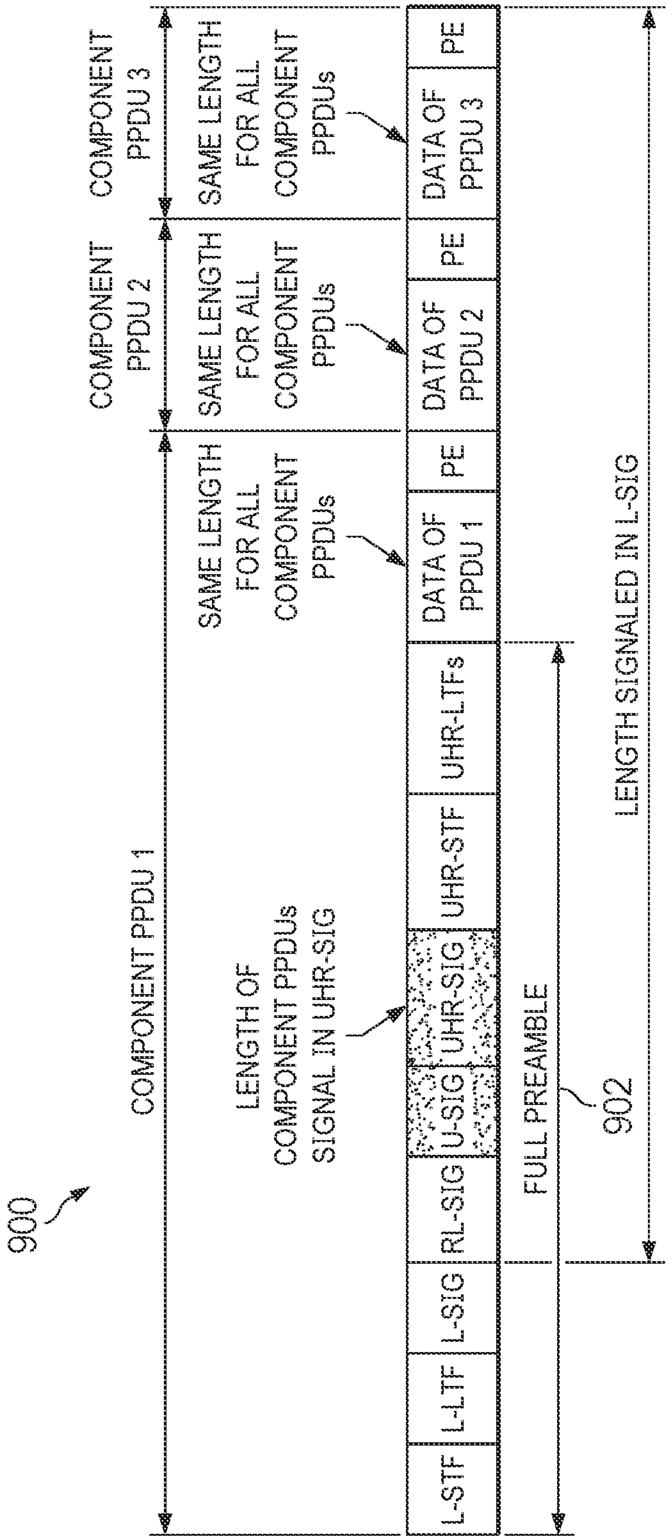
FIG. 9 illustrates an example C-PPDU that does not include MID-SIG preambles, according to some implementations.

FIG. 9 illustrates an example C-PPDU 900 that does not include MID-SIG preambles, according to some implementations. As shown in FIG. 9, the C-PPDU 900 includes a full preamble 902 in the first component PPDU (component PPDU 1) but does not include any preambles in the remaining component PPDUs (e.g., component PPDU 2 and component PPDU 3). In this example, all of the component PPDUs have data fields of the same length. Thus, the MID-SIG preambles in the component PPDUs after the first component PPDU are not needed and are omitted from the C-PPDU 900.

In some implementations, the access point 412 can use C-PPDUs in MU communications to the same target user set. In these implementations, the access point 412 concatenates component MU-PPDUs to create an MU C-PPDU. Further, the access point 412 aligns the users at the boundary of each component MU-PPDU within a MU C-PPDU. The component MU-PPDUs share same the physical layer parameters such as bandwidth (BW), RU allocation, MCS, NSS, etc. Because this information is shared by the component MU-PPDUs, the information is signaled in the full preamble of the first component MU-PPDU. However, the data field in each component MU-PPDU may have a different length, and therefore, may also have different LDPC coding related parameters. Because this information may differ from one component MU-PPDU to another, the information is signaled in a MID-SIG preamble for each component MU-PPDU after a first component MU-PPDU.

Figure 10A:
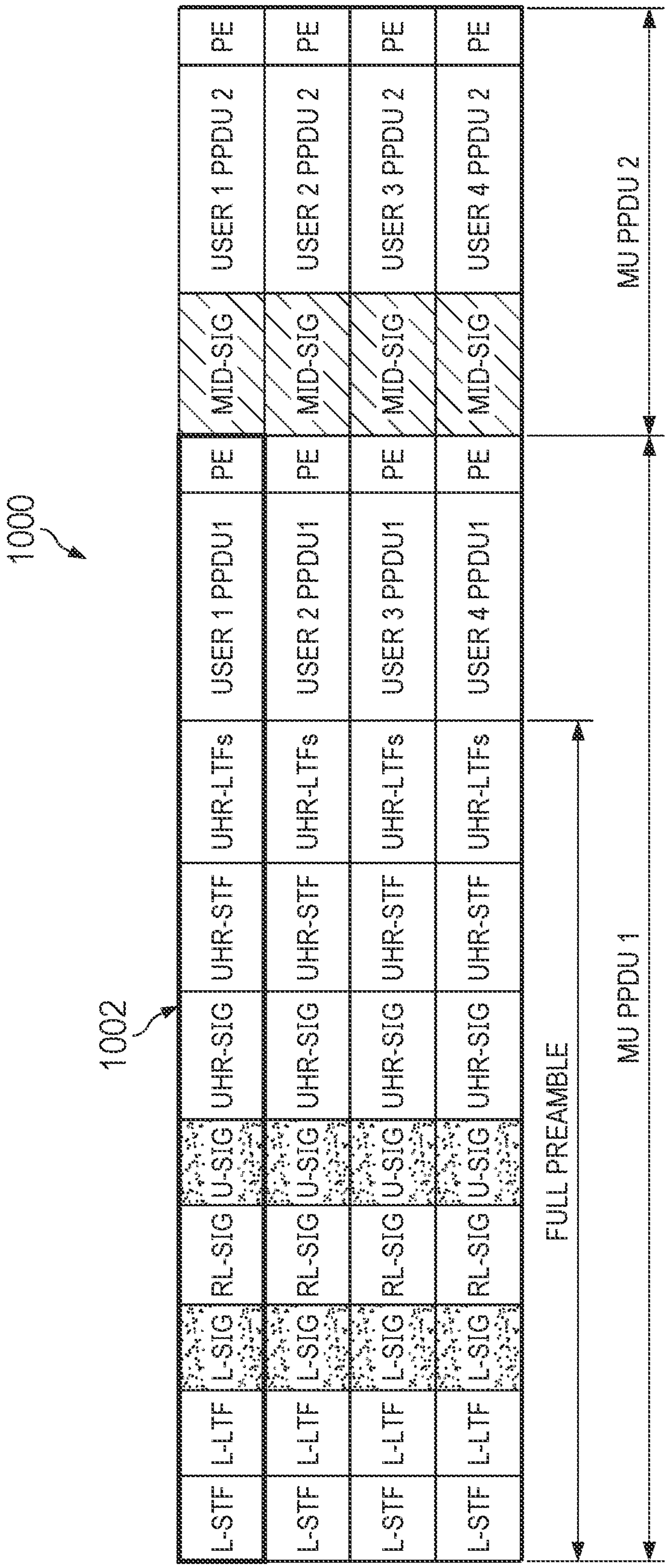
FIG. 10A illustrates an example MU C-PPDU, according to some implementations.

FIG. 10A illustrates an example MU C-PPDU 1000, according to some implementations. In this example, the access point 412 is communicating simultaneously with four users. As shown in FIG. 10A, the MU C-PPDU 1000 includes two MU-PPDUs: MU-PPDU 1 and MU-PPDU 2. The first MU-PPDU, MU-PPDU 1, includes full preambles for each component MU-PPDU (e.g., component MU-PPDU 1002), and the subsequent MU-PPDUs, e.g., MU-PPDU 2, include MID-SIG preambles for each component MU-PPDU. As also shown in FIG. 10A, the users are aligned at the boundary of each component MU-PPDU within the MU C-PPDU 1000. However, the data field of each component MU-PPDU may have a different length.

In some implementations, the preambles in different subchannels are aligned, but may carry different content. For example, in UHR-SIG, the content in odd indexed subchannels could be different from the UHR-SIG in even indexed subchannels. But UHR-SIG in all odd indexed subchannels can be the same and UHR-SIG in all even indexed subchannels can also be the same. Besides UHR-SIG, one subfield in U-SIG may also carry different content on different 80

MHz frequency segments. In 802.11be, "punctured Channel Information" subfield in U-SIG may be different on different 80 MHz frequency segments. But, within each 80 MHz segment, all the U-SIG contents can be the same.

In some implementations, the access point 412 can alternatively embed a C-PPDU within an MU-PPDU that is directed to the same target user set. In some examples, the access point 412 embeds the C-PPDU in a large size resource unit (e.g., >=242 tone RU or >=996 tone RU) in a MU-PPDU. In these implementations, the U-SIG reserved fields are duplicated across the different PPDUs, and therefore, cannot be used to signal presence of C-PPDU. In some examples, the access point 412 defines a bitmap in a common field of UHR-SIG field to indicate the presence of a C-PPDU (or format of a UHR-SIG) for each 20 MHz or 80 MHz sub-channel. For the C-PPDUs, the access point 412 also includes a field in the UHR-SIG to indicate the length of the first component PPDU.

Figure 10B:
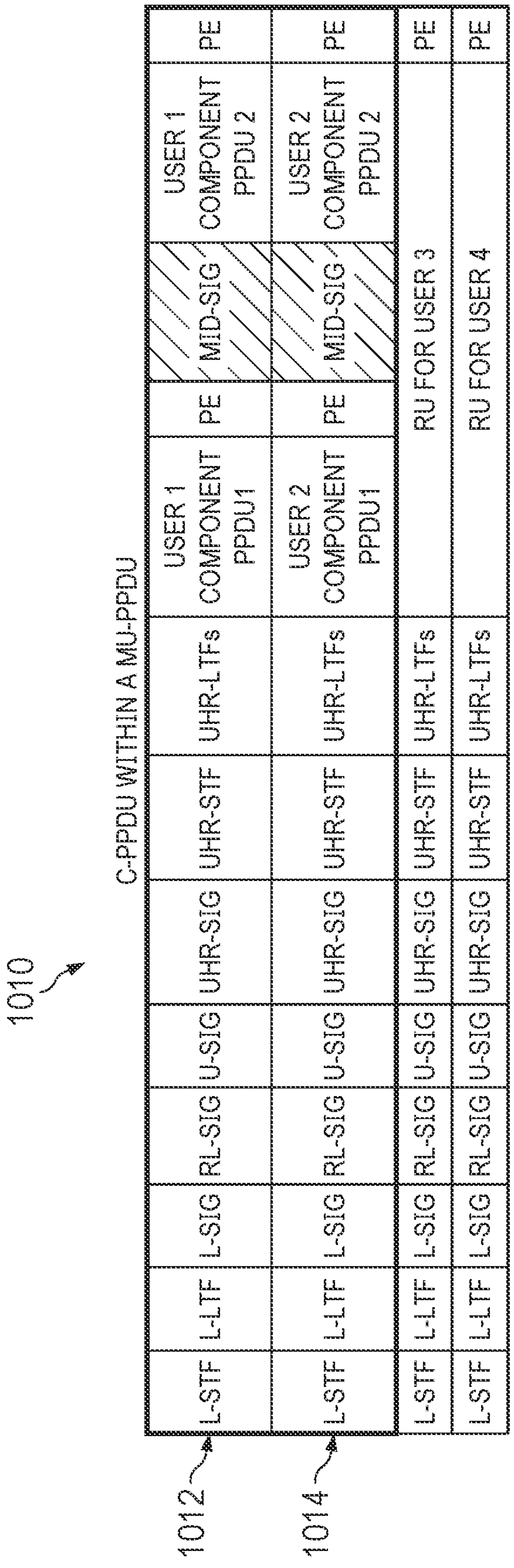
FIG. 10B illustrates an example MU PPDU, according to some implementations.

FIG. 10B illustrates an example MU PPDU 1010, according to some implementations. As shown in FIG. 10B, the MU-PPDU 1010 includes a first C-PDDU 1012, a second C-PPDU 1014, and two regular PPDUs. The first C-PPDU 1012 and the second C-PPDU 1014 are embedded within the MU-PPDU 1010.

In some implementations, the access point 412 can use frequency multiplexing to aggregate one or more C-PPDUs with other types of PPDUs (e.g., non-concatenated or regular PPDUs). In these implementations, some frequency segments of the overall bandwidth are allocated to C-PPDUs and other frequency segments are allocated to the regular PPDUs. For example, frequency domain aggregated PPDU (A-PPDU) supports aggregation of different PPDUs on different 80 MHz frequency segments. When using A-PDDU, the access point 412 can align C-PPDUs with the regular PPDUs such that the overall A-PPDU is aligned.

Figure 11A:
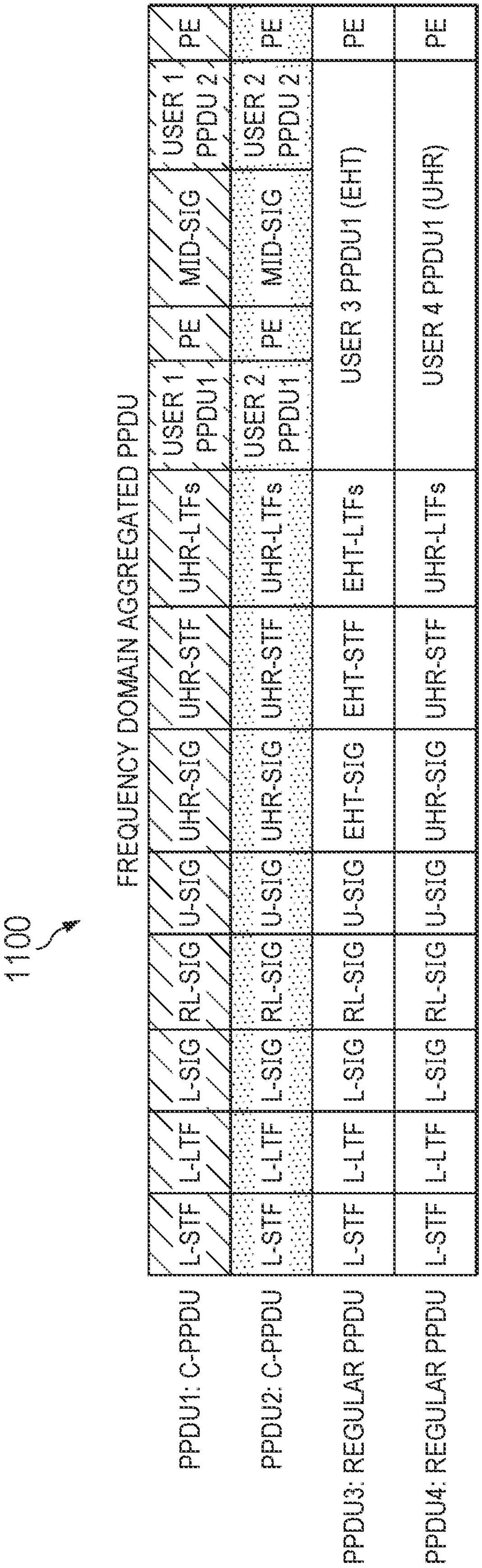
FIG. 11A illustrates an example aggregated PPDU (A-PPDU), according to some implementations.

FIG. 11A illustrates an example aggregated PPDU (A-PPDU) 1100, according to some implementations. In this example, the access point 412 is simultaneously transmitting PPDUs to four users by aggregating, in frequency, the respective PPDU for each user. Here, the access point 412 is transmitting C-PPDUs to two users (User 1, User 2) and regular PPDUs to two other users (User 3, User 4). Thus, the A-PPDU 1100 includes two C-PPDUs and two regular PPDUs. Assuming that the aggregated bandwidth is 80 MHz, 20 MHz can be allocated to each PPDU. As shown in FIG. 11A, the C-PPDUs are aligned with the regular PPDUs, such that the start and end of the C-PPDUs align with the start and end of the regular PPDUs.

In some implementations, if, in the case of aggregated PPDU, the aggregated PPDU includes C-PPDU in some of the frequency segments, then to align with the OFDM symbol boundaries in the other (regular) PPDUs, MID-SIG has a same symbol length as a data symbol. In these implementations, the MID-SIG length can be four times the MID-SIG length of the previously described implementations. Additionally, MID-SIG is assigned the same guard interval (GI) as data symbols. In some examples, the PE between component PPDUs is not present (but the PE in the last component PDU is present).

Figure 11B:
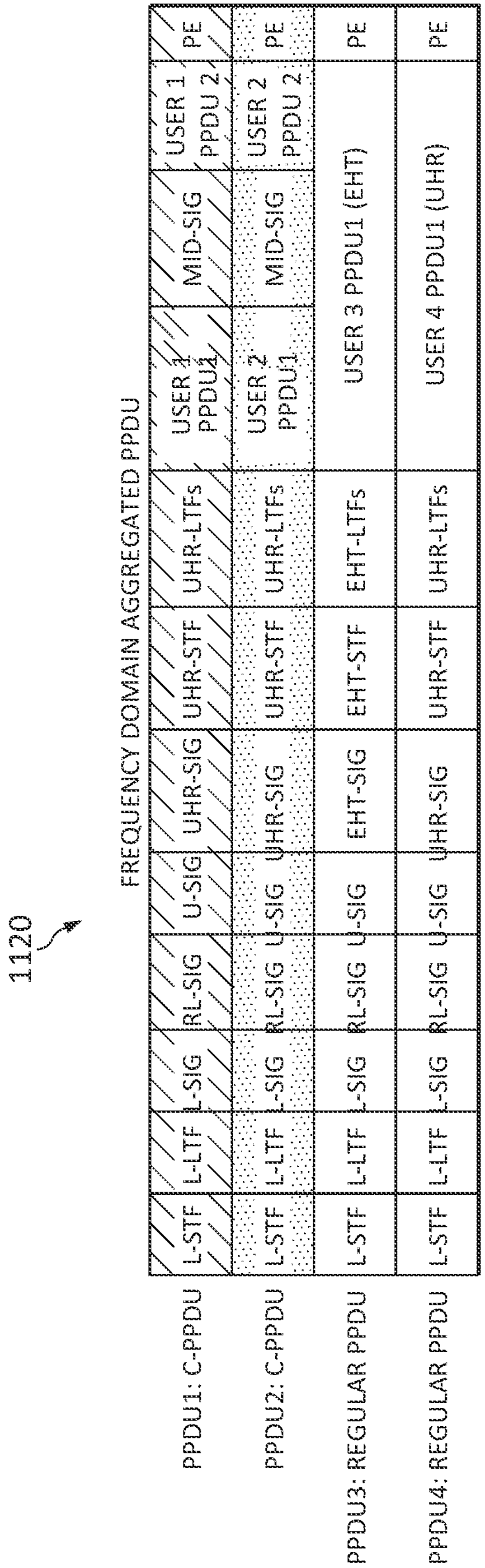
FIG. 11B illustrates another example aggregated PPDU (A-PPDU), according to some implementations.

FIG. 11B illustrates another example aggregated PPDU (A-PPDU) 1120, according to some implementations. As shown in FIG. 11B, the A-PPDU 1120 includes C-PPDU in some of the frequency segments (namely, PPDU 1 and PPDU 2). In the C-PPDUs, the MID-SIG in the second C-PPDU has a same symbol length as data symbol. Additionally, unlike the A-PPDU 1100, the PE between first and second component PPDUs is not present. This ensures that the C-PPDUs align with the OFDM symbol boundaries in the other (regular) PPDUs.

In some implementations, the access point 412 can direct a C-PPDU to different target stations. Specifically, the access point 412 may direct at least one component PPDU of the C-PPDU to a different target station. For a component PPDU that is sent to a different target station than preceding component PPDUs, the access point 412 includes UHR-SIG, UHR-STF, UHR-LTFs in the preamble of the component PPDU. These additional fields are included in the preamble in addition to MID-SIG. In some examples, the access point 412 positions the additional fields after the MID-SIG. Doing so allows the access point 412 to indicate the presence of the additional fields in MID-SIG. The access point 412 can use the additional fields to specify a different user set, RU allocation, MCS, NSS, etc., for each component PPDU.

Figure 12A:
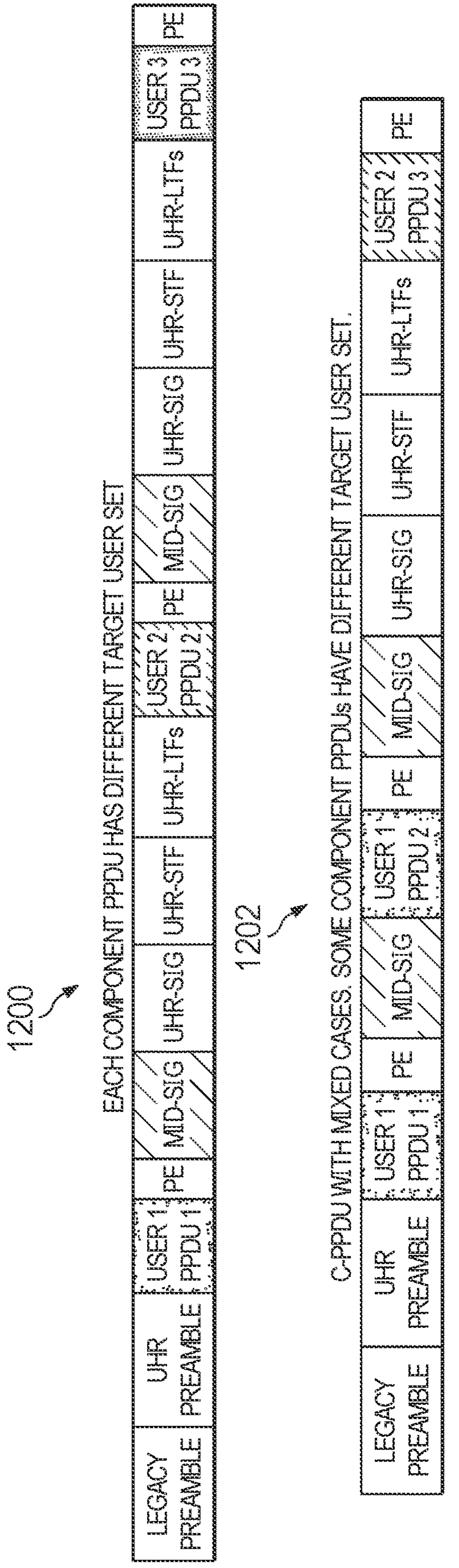
FIG. 12A illustrates example C-PPDUs that include component C-PPDUs directed to different target stations, according to some implementations.

FIG. 12A illustrates example C-PPDUs 1200, 1202 that include component C-PPDUs directed to different target stations. Both C-PPDU 1200 and C-PDDU 1202 include three component PPDUs. Starting with C-PPDU 1200, each of its component PPDUs has a different target user. In particular, the first component PPDU is directed to User 1, the second component PPDU is directed to User 2, and the third component PPDU is directed to User 3. Here, because the second and third component PPDUs are directed to different target users than the first component PPDU, the preamble of each of the component PPDUs includes: MID-SIG, UHR-SIG, UHR-STF, UHR-LTFs. Turning to the C-PPDU 1202, the first and second component PPDUs are directed to a first user, and the third component PPDU is directed to a second user. Here, because the second component PPDU is directed to the same user as the first component PPDU, the preamble of the second component PPDU only includes MID-SIG. Conversely, because the third component PPDU is directed to different user than the second component PPDU, the preamble of the third component PPDU includes: MID-SIG, UHR-SIG, UHR-STF, UHR-LTFs.

FIG. 12B illustrates a table 1220 of the subfields of another example MID-SIG, according to some implementations. This MID-SIG can be used in a component PPDU that is directed to a different user than the first component PPDU in a C-PPDU. The table 1220 is similar to the table 800, but with one difference—the table 1220 includes a "Presence of UHR-fields" field. This field, which is allocated one bit, indicates whether UHR-SIG, UHR-STF and UHR-LTF(s) are present in the corresponding component PPDU. For example, a value of 1 indicates the presence of the additional preamble fields.

In some implementations, the access point 412 may transmit a MU C-PPDU that is directed to a different set of target users. Additionally and/or alternatively, the access point 412 can allocate different RU allocations in each component MU-PPDU in the MU C-PPDU. In these implementations, if a component MU-PPDU changes any target user or RU allocation, the MU-PPDU includes UHR-STF and UHR-LTF fields after MID-SIG. However, if a component MU-PPDU keeps the same set of target users and the same RU allocation as the first component MU-PPDU, then a short preamble without UHR-STF and UHR-LTF is used. In some examples, the presence of UHR-SIG, UHR-STF, and UHR-LTF fields for a component MU-PPDU can be signaled in the MID-SIG for that component MU-PPDU. In other examples, the presence of UHR-SIG, UHR-STF, and UHR-LTF fields for a component MU-PPDU can be signaled in the preamble of a preceding component MU-PPDU. Doing so provides more processing time for the intended receiver.

Figure 13A:
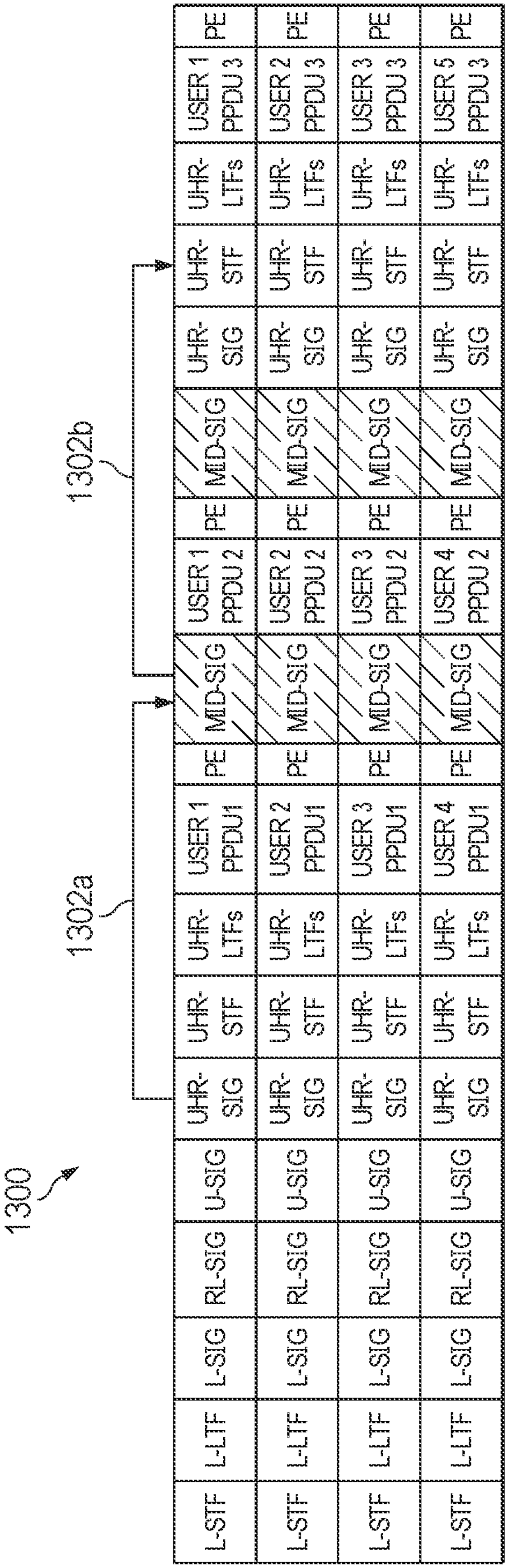
FIG. 13A illustrates an example MU C-PPDU that is directed to a different set of target users, according to some implementations.

FIG. 13A illustrates a MU C-PPDU 1300 that is directed to a different set of target users. As shown by arrows 1302*a*, 1302*b*, the presence of UHR-SIG, UHR-STF, and UHR-LTF fields for a component MU-PPDU can be signaled in the preamble of a preceding component MU-PPDU.

In some implementations, the access point 412 may use beamforming to communicate with the stations. In these implementations, if the different component PPDUs within a C-PPDU are directed to different users, then there could be risk that users of later component PPDUs being unable to track the carrier frequency offset (CFO) from previous component PPDUs because different component PPDUs have different beamforming matrices. In order to avoid this error, then the component PPDUs can include L-LTF, which can be used for channel estimation, before each MID-SIG so the user of each component PPDU can directly estimate the updated channel with the correct CFO.

Figure 13B:
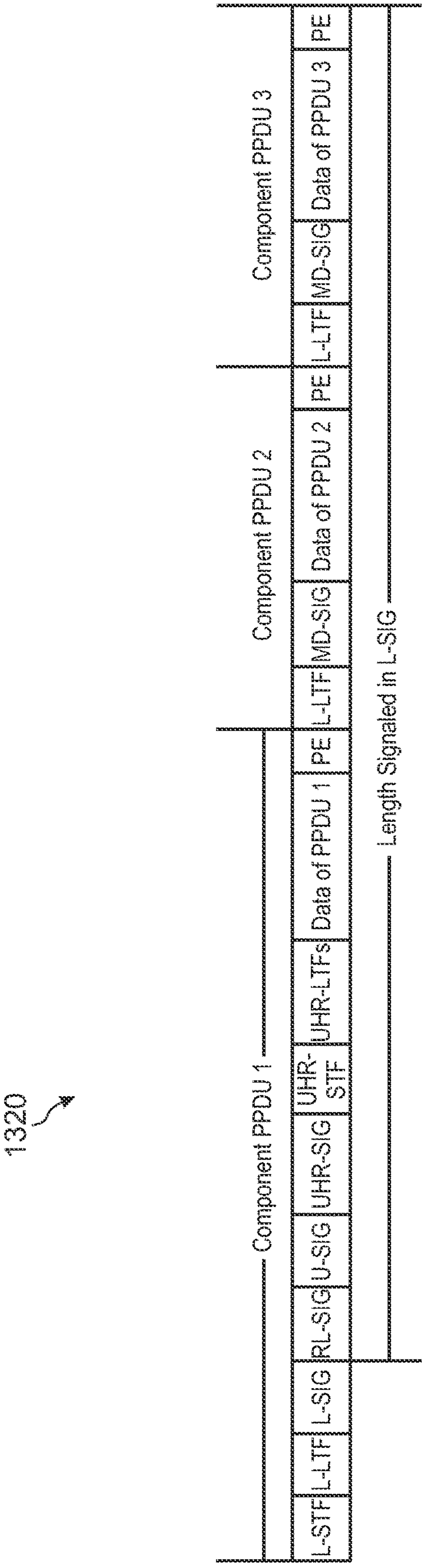
FIG. 13B illustrates an example C-PPDU that is directed to a different set of target users, according to some implementations.

FIG. 13B illustrates an example C-PPDU 1320 that is directed to a different set of target users, according to some implementations. In this example, the transmitter (e.g., the access point) communicates with the set of target users using beamforming. As shown in FIG. 13B, each of the component PPDUs (after the first component PPDU) includes L-LTF before MID-SIG.

In some implementations, if urgent data is sent in a component PPDU, the access point 412 can terminate the C-PPDU so that the receiver station can report ACK/BA for the component PPDU that carried the urgent data. In some examples, an indication that the PPDU is a last PPDU (i.e., early termination) is included in the component PPDU carrying the urgent data (since the C-PPDU is terminated after that component PPDU). The receiving station with knowledge of the last component PPDU will stop decoding after the last component PPDU. The receiving station can switch to packet detection or prepare for BA report. In some examples, the indication of the last component PPDU is signaled in the MID-SIG of the last component PPDU.

Figure 14:
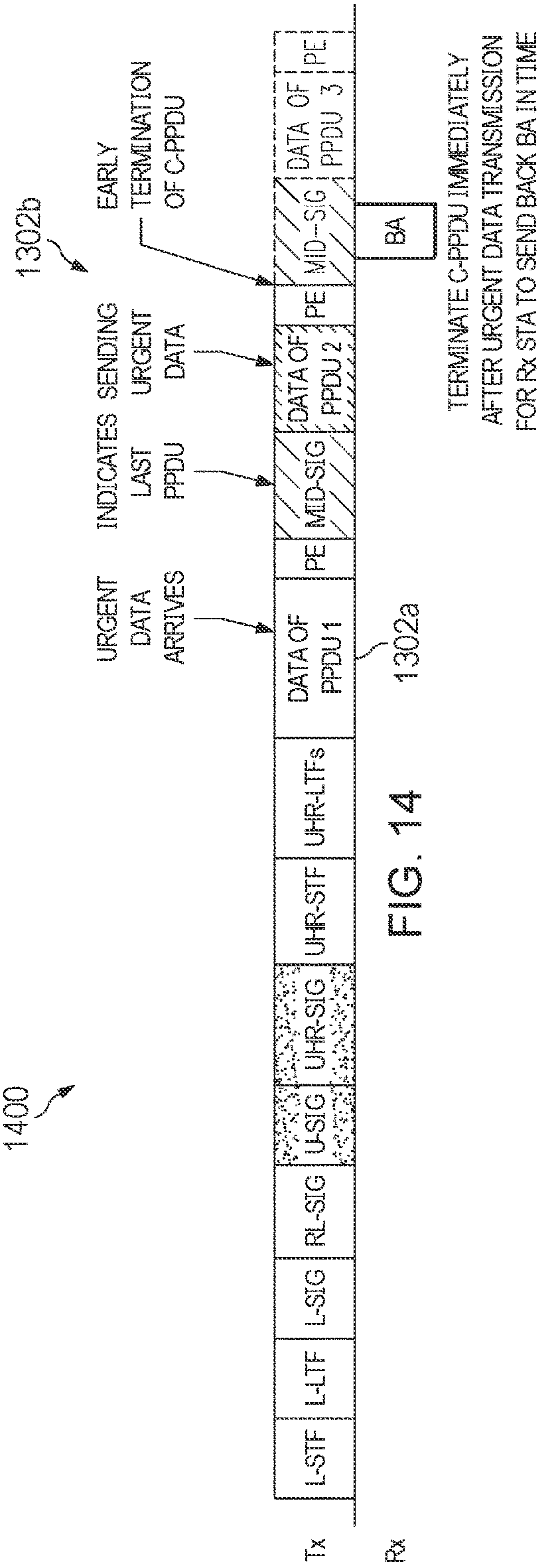
FIG. 14 illustrates an example C-PPDU termination, according to some implementations.

FIG. 14 illustrates an example of terminating a C-PPDU 1400, according to some implementations. In this example, a transmitter is scheduled to transmit to a receiver the C-PPDU 1400 that includes three component PPDUs. During the transmission of a first component PPDU of the C-PPDU 1400, the transmitter, e.g., access point 412, receives urgent data for transmission. The transmitter determines to transmit the urgent data in the next component PPDU. Additionally, the transmitter determines to terminate the C-PPDU 1400 after the second component PPDU is transmitted so that the transmitter can receive a BA from the receiver for the urgent data. Thus, the transmission of the third component PPDU is cancelled or delayed. In response to these determinations, the transmitter includes in a MID-SIG preamble of a second component PPDU an indication that the second component PPDU is the last PPDU. The transmitter then sends the urgent data in the data field of the second component PPDU. After the second component PPDU is transmitted, the transmitter terminates the C-PPDU 1400 and monitors the channel for a BA from the receiver.

Figure 15A:
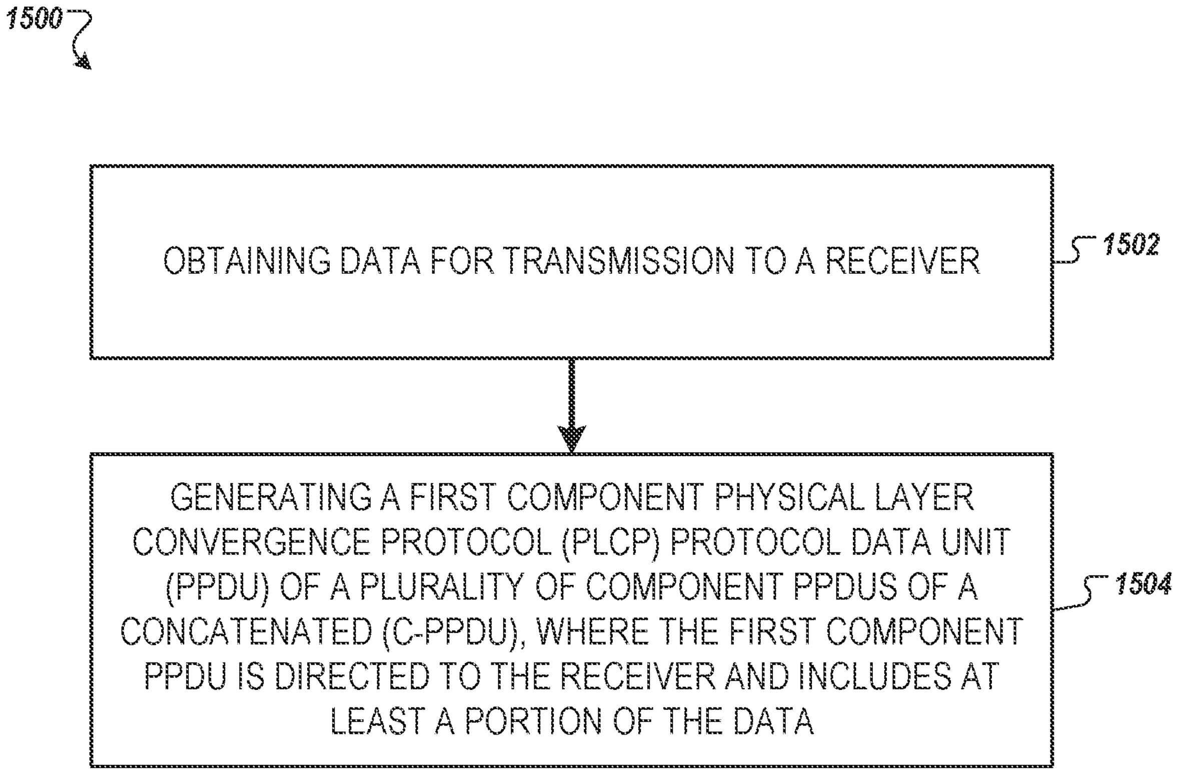
FIG. 15A illustrates a flowchart of an example method, according to some implementations.

FIG. 15A illustrates a flowchart of an example method 1500, according to some implementations. For clarity of presentation, the description that follows generally describes method 1500 in the context of the other figures in this description. For example, method 1500 can be performed by a transmitter, which may be electronic devices 410 or access point 412 of FIG. 4. It will be understood that method 1500 can be performed, for example, by any suitable system, environment, software, hardware, or a combination of systems, environments, software, and hardware, as appropriate. In some implementations, various steps of method 1500 can be run in parallel, in combination, in loops, or in any order.

At 1502, method 1500 involves obtaining data for transmission to a receiver.

At 1504, method 1500 involves generating a first component physical layer convergence protocol (PLCP) protocol data unit (PPDU) of a plurality of component PPDUs of a concatenated (C-PPDU), where the first component PPDU is directed to the receiver and includes at least a portion of the data.

In some implementations, the plurality of component PPDUs are scheduled to be transmitted consecutively in time.

In some implementations, generating the first component PPDU involves including the portion of the data in a data field of the first component PPDU, and method 1500 further involves transmitting the first component PPDU to the receiver.

In some implementations, method 1500 further involves receiving, from the receiver, a block acknowledgement (BA) for the first component PPDU after the plurality of component PPDUs are transmitted.

In some implementations, generating the first component PPDU involves determining that a length of the first component PPDU is less than or equal to a desired communication latency between the transmitter and the receiver.

In some implementations, the desired communication latency is 1 millisecond (ms).

In some implementations, generating the first component PPDU involves determining to operate in a low latency mode; and responsively generating the first component PPDU.

In some implementations, generating the first component PPDU involves generating a full preamble for the first component PPDU, the full preamble including at least one of: (i) a length field that includes a length of the C-PPDU, (ii) a universal signal field (U-SIG) that includes a format of the C-PPDU, or (iii) a local signal field that includes a length of the first component PPDU.

In some implementations, method 1500 further involves: generating a second component PPDU of the plurality, the second component PPDU is directed to the receiver; and including in the second component PPDU an abbreviated preamble including at least one of: (i) a target field that indicates whether the second component PPDU is directed to the same receiver as the first component PPDU; or (ii) a second length field that includes a length of the second component PPDU.

In some implementations, method 1500 further involves generating a second component PPDU of the plurality, the second component PPDU is directed to the receiver; and including in the second component PPDU an abbreviated preamble including at least one of: (i) a target field that indicates whether the second component PPDU is directed to the same receiver as the first component PPDU; or (ii) a second length field that includes a number of symbols in a data field of the second component PPDU.

In some implementations, lengths of respective data fields of the plurality of component PPDUs are identical, and method 1500 further involves generating a second component PPDU of the plurality without a preamble, where the second component PPDU is directed to the receiver.

In some implementations, the receiver is a first receiver, and method 1500 further involves: generating a second component PPDU of the plurality, where the second component PPDU is directed to a second receiver; and including in the second component PPDU an abbreviated preamble including: a mid signal (MID-SIG) preamble signaling length and coding related physical layer parameters of the second component PPDU; and a plurality of fields signaling physical layer parameters of the second component PPDU, where a presence of the plurality of fields in the abbreviated preamble is signaled in the MID-SIG preamble.

In some implementations, generating the first component PPDU further involves multiplexing the first component PPDU in frequency with at least one other PPDU in a multiuser PPDU (MU-PPDU).

In some implementations, the at least one other PPDU is another component PPDU.

In some implementations, the MU-PPDU is directed to: (i) one or more users of a first target user set, or (ii) one or more users of different target user sets.

In some implementations, generating the first component PPDU further involves aggregating the first component PPDU in frequency with at least one other PPDU in an aggregated PPDU (A-PPDU), where the at least one other PPDU is a regular PPDU.

In some implementations, the receiver is a first receiver, and at least one of the plurality of component PPDUs is directed to a second receiver different than the first receiver.

In some implementations, method 1500 further involves: transmitting the first component PPDU to the receiver; during transmission of the first component PPDU, obtaining urgent data for transmission to the receiver; in response, generating a second component PPDU that includes an abbreviated preamble; including in the abbreviated preamble an indication that the second component PPDU is a last component PPDU of the C-PPDU; and terminating the C-PPDU after transmitting the second component PPDU.

In some implementations, method 1500 further involves receiving, from the receiver, a block acknowledgment after transmitting the second component PPDU.

Figure 15B:
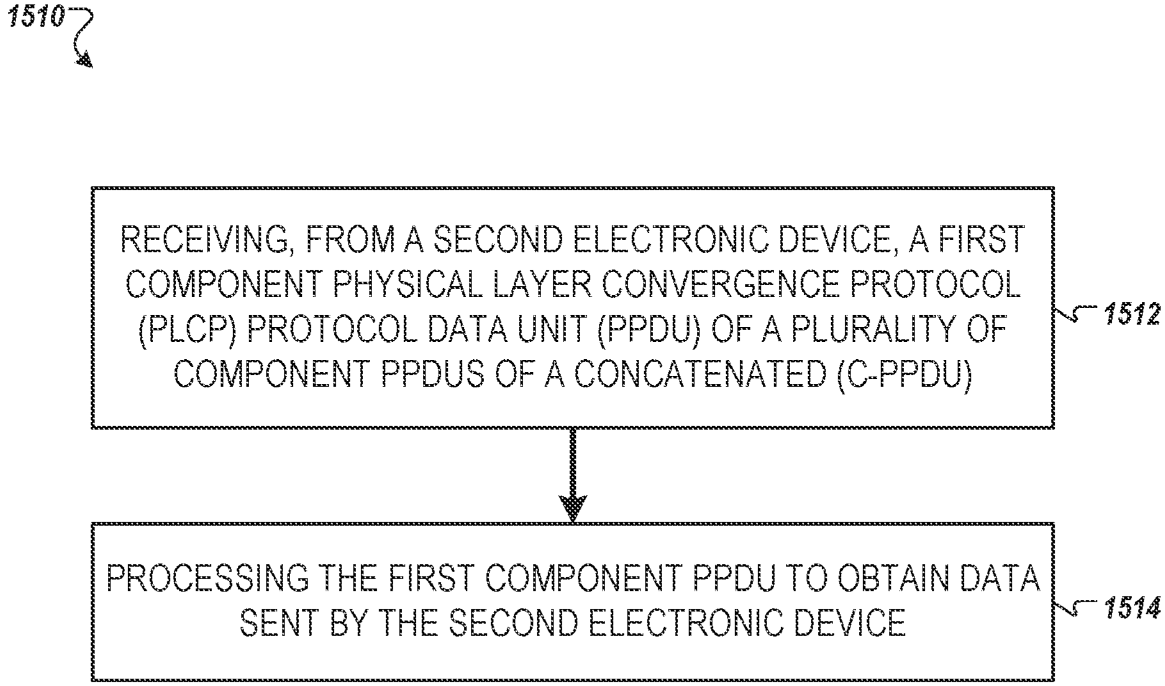
FIG. 15B illustrates a flowchart of another example method, according to some implementations.

FIG. 15B illustrates a flowchart of an example method 1510, according to some implementations. For clarity of presentation, the description that follows generally describes method 1510 in the context of the other figures in this description. For example, method 1510 can be performed by a receiver, which may be electronic devices 410 or access point 412 of FIG. 4. It will be understood that method 1502 can be performed, for example, by any suitable system, environment, software, hardware, or a combination of systems, environments, software, and hardware, as appropriate. In some implementations, various steps of method 1500 can be run in parallel, in combination, in loops, or in any order.

At 1512, method 1510 involves receiving, from a second electronic device, a first component physical layer convergence protocol (PLCP) protocol data unit (PPDU) of a plurality of component PPDUs of a concatenated (C-PPDU).

At 1514, method 1510 involves processing the first component PPDU to obtain data sent by the second electronic device.

Figure 16:
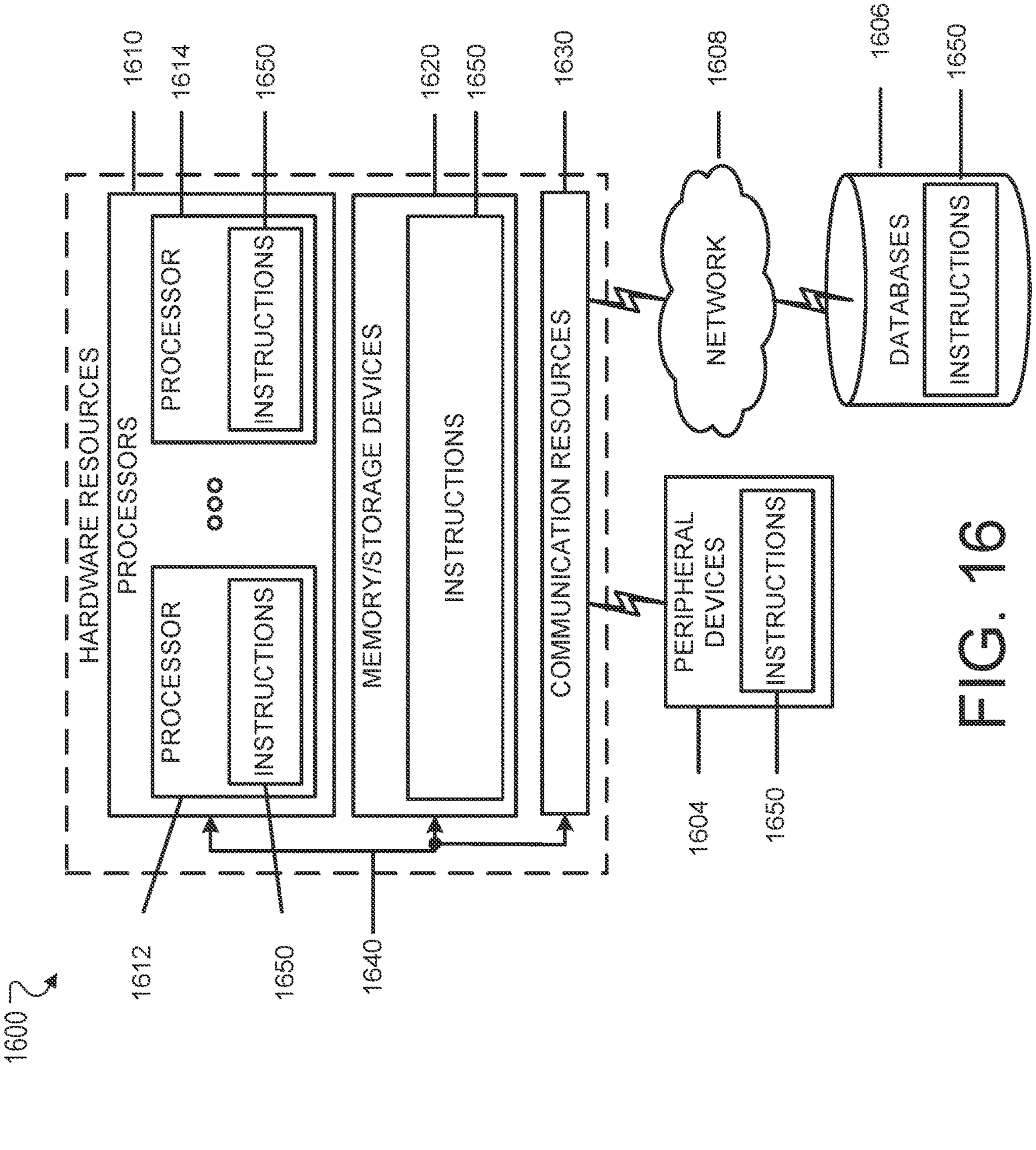
FIG. 16 illustrates a block diagram of an example electronic device, according to some implementations.

FIG. 16 illustrates a block diagram of an electronic device 1600, according to some implementations. The electronic device 1600 may be a cellular telephone, a smartwatch, an access point, a wireless speaker, an IoT device, another other examples. The electronic device 1600 includes hardware resources that include one or more processors (or processor cores) 1610, one or more memory/storage devices 1620, and one or more communication resources 1630, each of which may be communicatively coupled via a bus 1640.

The one or more processors 1610 (also referred to as processing circuitry) include one or more devices configured to perform computational operations. For example, the one or more processors 1610 can include one or more microprocessors, application-specific integrated circuits (ASICs), microcontrollers, graphics processing units (GPUs), programmable-logic devices, and/or one or more digital signal processors (DSPs). The processors 1610 may also include, for example, a processor 1612 and a processor 1614. The processor(s) 1610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1620 may include main memory, disk storage, or any suitable combination thereof. The memory/storage devices 1620 may include, but are not limited to, any type of volatile or nonvolatile memory such as dynamic random-access memory (DRAM), static random-access memory (SRAM), erasable programmable read-only memory (EPROM), electrically erasable programmable read-only memory (EEPROM), Flash memory, solid-state storage, etc. In some implementations, memory/storage devices 1620 are coupled to one or more high-capacity mass-storage devices (not shown). In some examples, memory/storage devices 1620 can be coupled to a magnetic or optical drive, a solid-state drive, or another type of mass-storage device. In these examples, the memory/storage devices 1620 can be used by electronic device 1600 as fast-access storage for often-used data, while the mass-storage device is used to store less frequently used data.

The communication resources 1630 may include interconnection or network interface components or other suitable devices to communicate with one or more peripheral devices 1604 or one or more databases 1606 via a network 1608. For example, the communication resources 1630 may include wired communication components (e.g., for coupling via USB), cellular communication components, NFC components, Bluetooth® (or Bluetooth® Low Energy) components, Wi-Fi® components, and other communication components.

More specifically, communication resources 1630 include one or more devices configured to couple to and communicate on a wired and/or wireless network (i.e., to perform network operations), such as: control logic, one or more interface circuits and a set of antennas (or antenna elements) in an adaptive array that can be selectively turned on and/or off by control logic to create a variety of optional antenna patterns or "beam patterns." Alternatively, instead of the set of antennas, in some examples, electronic device 1600 includes one or more nodes, e.g., a pad or a connector, which can be coupled to the set of antennas. Thus, electronic device 1600 may or may not include the set of antennas. For example, communication resources 1630 can include a Bluetooth™ networking system, a cellular networking system (e.g., a 4G/5G/6G network such as LTE, etc.), a universal serial bus (USB) networking system, a networking system based on the standards described in IEEE 802.11 (e.g., a Wi-Fi® networking system), an Ethernet networking system, and/or another networking system.

In some implementations, communication resources 1630 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Communication resources 1630 include processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a "network interface" for the network system.

Instructions 1650 may comprise software, a program, an application, an applet, an app, or other executable code for causing at least any of the processors 1610 to perform any one or more of the methodologies discussed herein. The instructions 1650 may reside, completely or partially, within at least one of the processors 1610 (e.g., within the processor's cache memory), the memory/storage devices 1620, or any suitable combination thereof. Furthermore, any portion of the instructions 1650 may be transferred to the hardware resources from any combination of the peripheral devices 1604 or the databases 1606. Accordingly, the memory of processors 1610, the memory/storage devices 1620, the peripheral devices 1604, and the databases 1606 are examples of computer-readable and machine-readable media.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using instructions 1650, operating system (such as a driver for an interface circuit in communication resources 1630) or in firmware in an interface circuit in communication resources 1630. Additionally or alternatively, at least some of the operations in the communication techniques may be implemented in a physical layer, such as hardware in an interface circuit in communication resources 1630. In some implementations, the communication techniques are implemented, at least in part, in a MAC layer and/or in a physical layer in an interface circuit in communication resources 1630.

Moreover, while the preceding embodiments illustrated the use of wireless signals in one or more bands of frequencies, in other embodiments of the communication techniques electromagnetic signals in one or more different frequency bands are used to determine the range. For example, these signals may be communicated in one or more bands of frequencies, including: a microwave frequency band, a radar frequency band, 900 MHz, 2.4 GHz, 5 GHz, 6 GHz, 60 GHz, and/or a band of frequencies used by a Citizens Broadband Radio Service, by LTE, 5G, or any other communication system.

Although specific components are used to describe electronic device 1600, in alternative embodiments, different components and/or subsystems may be present in electronic device 1600. For example, electronic device 1600 may include one or more additional processing subsystems, memory subsystems, networking subsystems, and/or display subsystems. Additionally, one or more of the subsystems may not be present in electronic device 1600. Moreover, in some examples, electronic device 1600 may include one or more additional subsystems that are not shown in FIG. 16. In some implementations, electronic device may include an analysis subsystem that performs at least some of the operations in the communication techniques. Also, although separate subsystems are shown in FIG. 16, in some examples some or all of a given subsystem or component can be integrated into one or more of the other subsystems or component(s) in electronic device 1600.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. One or more processors configured to perform operations comprising:

obtaining data for transmission to a receiver;

generating a first component physical layer convergence protocol (PLCP) protocol data unit (PPDU) of a plurality of component PPDUs of a concatenated PPDU (C-PPDU), wherein the first component PPDU is directed to the receiver and includes at least a portion of the data;

generating one or more component PPDUs other than the first component PPDU of the plurality; and including, in at least one of the one or more component PPDUs, a respective abbreviated preamble, wherein the respective abbreviated preamble comprises a target field indicating whether the at least one component PPDU is directed to a same receiver as or to a different receiver from a last component PPDU among previous component PPDUs of the plurality.

2. The one or more processors of claim 1, wherein the plurality of component PPDUs are scheduled to be transmitted consecutively in time.

3. The one or more processors of claim 1, wherein generating the first component PPDU comprises including the portion of the data in a data field of the first component PPDU, and the operations further comprising:

causing transmission of the first component PPDU to the receiver.

4. The one or more processors of claim 1, wherein generating the first component PPDU comprises:

determining that a length of the first component PPDU is less than or equal to a desired communication latency between a transmitter and the receiver.

5. The one or more processors of claim 4, wherein the desired communication latency is 1 millisecond (ms).

6. The one or more processors of claim 1, wherein generating the first component PPDU comprises:

determining to operate in a low latency mode; and responsively generating the first component PPDU.

7. The one or more processors of claim 1, wherein generating the first component PPDU comprises:

generating a full preamble for the first component PPDU, the full preamble comprising at least one of: (i) a length field that includes a length of the C-PPDU, (ii) a universal signal field (U-SIG) that includes a format of the C-PPDU, or (iii) a local signal field that includes a length of the first component PPDU.

8. The one or more processors of claim 7, wherein generating the one or more component PPDUs other than the first component PPDU of the plurality comprises:

generating a second component PPDU of the plurality, wherein the second component PPDU is directed to the receiver, and wherein including, in the at least one of the one or more component PPDUs, the respective abbreviated preamble comprises:

including, in the second component PPDU, an abbreviated preamble comprising at least one of:

(i) a first target field that indicates whether the second component PPDU is directed to the same receiver as the first component PPDU; or (ii) a second length field that includes a length of the second component PPDU.

9. The one or more processors of claim 7, wherein generating the one or more component PPDUs other than the first component PPDU of the plurality comprises:

generating a second component PPDU of the plurality, wherein the second component PPDU is directed to the receiver, and wherein including, in the at least one of the one or more component PPDUs, the respective abbreviated preamble comprises:

including, in the second component PPDU, an abbreviated preamble comprising at least one of:

(i) a first target field that indicates whether the second component PPDU is directed to the same receiver as the first component PPDU; or (ii) a second length field that includes a number of symbols in a data field of the second component PPDU.

10. The one or more processors of claim 7, wherein lengths of respective data fields of the plurality of component PPDUs are identical, and wherein generating the one or more component PPDUs other than the first component PPDU of the plurality comprises:

generating a second component PPDU of the plurality without a preamble, wherein the second component PPDU is directed to the receiver.

11. The one or more processors of claim 7, wherein the receiver is a first receiver, and wherein generating the one or more component PPDUs other than the first component PPDU of the plurality comprises:

generating a second component PPDU of the plurality, wherein the second component PPDU is directed to a second receiver, and wherein including, in the at least one of the one or more component PPDUs, the respective abbreviated preamble comprises:

including, in the second component PPDU, an abbreviated preamble comprising:

a mid signal (MID-SIG) preamble signaling length and coding related physical layer parameters of the second component PPDU; and a plurality of fields signaling physical layer parameters of the second component PPDU, wherein a presence of the plurality of fields in the abbreviated preamble is signaled in the MID-SIG preamble.

12. The one or more processors of claim 1, wherein generating the first component PPDU further comprises:

multiplexing the first component PPDU in frequency with at least one other PPDU in a multiuser PPDU (MU-PPDU).

13. The one or more processors of claim 12, wherein the at least one other PPDU is another component PPDU.

14. The one or more processors of claim 13, wherein the MU-PPDU is directed to: (i) one or more users of a first target user set, or (ii) one or more users of different target user sets.

15. The one or more processors of claim 1, wherein generating the first component PPDU further comprises:

aggregating the first component PPDU in frequency with at least one other PPDU in an aggregated PPDU (A-PPDU), wherein the at least one other PPDU is a regular PPDU.

16. The one or more processors of claim 1, the operations further comprising:

causing transmission of the first component PPDU to the receiver;

during transmission of the first component PPDU, obtaining urgent data for transmission to the receiver;

in response, generating a second component PPDU that includes an abbreviated preamble;

including, in the abbreviated preamble, an indication that the second component PPDU is a last component PPDU of the C-PPDU; and terminating the C-PPDU after causing transmission of the second component PPDU.

17. The one or more processors of claim 16, the operations further comprising:

receiving, from the receiver, a block acknowledgment after causing transmission of the second component PPDU.

18. The one or more processors of claim 1, wherein the receiver is a first receiver, and wherein generating the one or more component PPDUs other than the first component PPDU of the plurality comprises:

generating a second component PPDU of the plurality, wherein the second component PPDU is directed to a second receiver; and including, in the second component PPDU, a mid signal (MID-SIG) preamble and a legacy long training field (L-LTF).

19. An apparatus comprising:

one or more processors configured to perform operations comprising:

receiving, from an electronic device, a first component physical layer convergence protocol (PLCP) protocol data unit (PPDU) and one or more component PPDUs other than the first component PPDU of a plurality of component PPDUs of a concatenated PPDU (C-PPDU), wherein each of the one or more component PPDUs comprises a respective abbreviated preamble, and wherein the respective abbreviated preamble comprises a target field indicating that each of the one or more component PPDUs is directed to the apparatus; and processing the first component PPDU and the one or more component PPDUs to obtain data sent by the electronic device.

20. A transmitter comprising:

processing circuitry configured to cause the transmitter to:

obtain data for transmission to a receiver;

generate a first component physical layer convergence protocol (PLCP) protocol data unit (PPDU) of a plurality of component PPDUs of a concatenated PPDU (C-PPDU), wherein the first component PPDU is directed to the receiver and includes at least a portion of the data;

generate one or more component PPDUs other than the first component PPDU of the plurality; and include, in at least one of the one or more component PPDUs, a respective abbreviated preamble, wherein the respective abbreviated preamble comprises a target field indicating whether the at least one component PPDU is directed to a same receiver as or to a different receiver from a last component PPDU among previous component PPDUs of the plurality.

* * * * *